US011945359B2

(12) United States Patent
Andre et al.

(10) Patent No.: US 11,945,359 B2
(45) Date of Patent: Apr. 2, 2024

(54) RATCHET TIE-DOWN TENSIONER

(71) Applicant: LOHR INDUSTRIE, Hangenbieten (FR)

(72) Inventors: Jean-Luc Andre, Molsheim (FR); Bertrand Dessauny, Niederhaslach (FR)

(73) Assignee: LOHR INDUSTRIE, Hangenbieten (FR)

( * ) Notice: Subject to any disclaimer, the term of this patent is extended or adjusted under 35 U.S.C. 154(b) by 458 days.

(21) Appl. No.: 17/280,943

(22) PCT Filed: Nov. 6, 2019

(86) PCT No.: PCT/FR2019/052624
§ 371 (c)(1),
(2) Date: Mar. 29, 2021

(87) PCT Pub. No.: WO2020/104740
PCT Pub. Date: May 28, 2020

(65) Prior Publication Data
US 2021/0339672 A1    Nov. 4, 2021

(30) Foreign Application Priority Data

Nov. 23, 2018    (FR) ...................................... 1871771

(51) Int. Cl.
*B60P 7/08*    (2006.01)
*B60P 3/075*    (2006.01)

(52) U.S. Cl.
CPC ............... *B60P 7/083* (2013.01); *B60P 3/075* (2013.01)

(58) Field of Classification Search
CPC . B60P 7/083; B60P 3/075; B66D 1/04; B66D 3/02
(Continued)

(56) References Cited

U.S. PATENT DOCUMENTS 1,832,805 A * 11/1931 Brewster ................ B61H 13/04
74/156
3,187,864 A *  6/1965 Tonkin .................... F16D 41/18
188/82.7
(Continued)

FOREIGN PATENT DOCUMENTS

CH          714365 A2 *  5/2019    ............... G04B 1/10
DE     4227781 A1 *  2/1994    ......... B60R 22/4619
(Continued)

OTHER PUBLICATIONS

International Search Report issued in PCT Patent Application No. PCT/FR2019/052624 dated Feb. 18, 2020.

*Primary Examiner* — Hilary L Gutman
(74) *Attorney, Agent, or Firm* — MARSHALL, GERSTEIN & BORUN LLP

(57) ABSTRACT

The ratchet tie-down tensioner includes a ratchet engagement head actuated by a tensioning bar, a tie-down engagement head connected to a tie-down winding shaft, a ratchet engaged with outer inclined teeth of the tie-down engagement head and a ratchet drive mechanism located between the two engagement heads. The drive mechanism includes a self-centering crown floatingly supported in the body and a gear attached to the ratchet engagement head and mounted in the self-centering crown. The gear has a toothing on the outer periphery thereof which is provided to engage with the inner toothing of the self-centering crown, at least one of said toothings comprising curved spring blades. Said tie-down tensioner makes it possible for tensioning cycles to be performed by moving the bar back and forth.

19 Claims, 11 Drawing Sheets

(58) Field of Classification Search
USPC .......................................................... 410/23
See application file for complete search history.

(56) References Cited

U.S. PATENT DOCUMENTS

| | | | | |
|---|---|---|---|---|
| 3,638,774 | A * | 2/1972 | Burch | ..................... F16D 41/12 |
| | | | | 192/103 B |
| 3,670,589 | A * | 6/1972 | Carter | ................... F16H 31/001 |
| | | | | 254/354 |
| 3,869,098 | A * | 3/1975 | Sprecher | ................. B60R 22/44 |
| | | | | 242/385.3 |
| 5,297,752 | A * | 3/1994 | Brown | .................... B60R 22/44 |
| | | | | 242/375.3 |
| 7,527,462 | B2 | 5/2009 | Chou | |
| 9,610,884 | B1 | 4/2017 | Howes et al. | |
| 2011/0284678 | A1 * | 11/2011 | Wang | ..................... B60P 7/083 |
| | | | | 242/394 |

FOREIGN PATENT DOCUMENTS

| | | | | | |
|---|---|---|---|---|---|
| EP | | 331982 | A * | 9/1989 | ............... F02C 7/277 |
| GB | | 223225 | A * | 10/1925 | |
| GB | | 648163 | A * | 12/1950 | |
| GB | | 1423082 | A * | 1/1976 | ............... F16H 1/20 |
| WO | WO-2010/057244 | A1 | | 5/2010 | |

\* cited by examiner

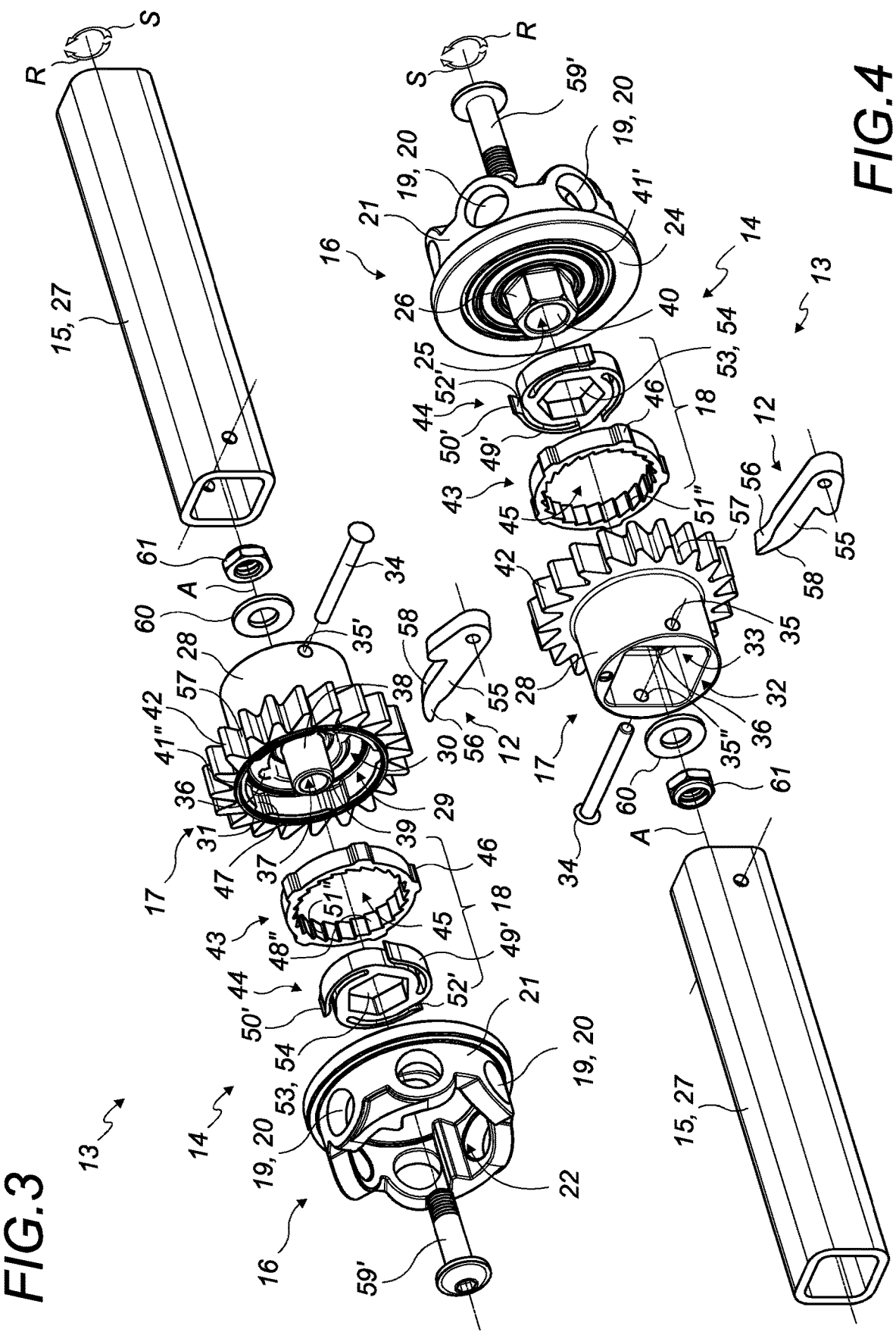

RATCHET TIE-DOWN TENSIONER

TECHNICAL FIELD

The present invention relates to a ratchet tie-down tensioner associated with a tie-down winding shaft, in particular designed to secure a load to a loading platform, more particularly a car to the platform of a car carrier by means of a tie-down of the strap, cable or chain type passed around a tire and attached to the holes in the deck of the car carrier.

More particularly, the invention concerns a ratchet tie-down tensioner actuated by a tensioning bar and which allows the tensioning bar to be returned to its initial position without needing to remove it momentarily from the tie-down tensioner, by virtue of a pawl located between the tensioning bar and the driving part of the tie-down winding shaft.

BACKGROUND OF THE DISCLOSURE

The ratchet strap tensioner tie-down system currently used by the applicant is shown in FIGS. 1 and 2.

This tie-down system includes a lashing drum adapted to a car carrier and actuated by a tensioning bar in order to wind a strap around a strap winding shaft. The strap is wound and tensioned around the strap winding shaft when the strap tensioner is actuated by means of the tensioning bar. When the force transmitted by the tensioning bar is released, a pivoting finger-type pawl forming part of the tie-down system prevents rotation and keeps the strap taut.

However, with the existing tie-down system, in order to tension the strap, the user must reposition the tensioning bar several times in a cavity provided on the mechanism in order to secure the car. Indeed, during a tensioning cycle, the tensioning bar is first inserted in a tensioning position into a cavity provided on the mechanism, tensioning is then carried out until the bar is brought into abutment, and the bar is then withdrawn from its cavity before being reinserted in the tensioning position in order to start a new tensioning cycle.

Repositioning the tensioning bar several times in its cavity is a tedious operation which takes up a great deal of the user's time, in particular when a long length of strap is to be wound.

There is therefore a need for a tie-down system in which it is possible to return the tensioning bar to the initial position in order to start a new tensioning cycle without needing to remove the bar from its cavity, i.e., by simply moving the tensioning bar back and forth, in the manner of a ratchet wrench.

SUMMARY OF THE DISCLOSURE

Therefore, the object of the present invention is to overcome the disadvantages of the prior art by proposing a novel ratchet tie-down tensioner comprising the following means:

a ratchet engagement head that is rotated, when actuated, in a first direction referred to as the "tensioning" direction and in the opposite direction referred to as the "return to initial position" direction;

a tie-down engagement head connected to a tie-down winding shaft for rotating said tie-down winding shaft, said tie-down engagement head having a hollow body with inclined teeth on its outer periphery;

a pawl engaged with the outer inclined teeth of the tie-down engagement head in order to allow the latter to rotate in the tensioning direction and prevent it from rotating in the return to initial position direction; and a ratchet drive mechanism located between the ratchet engagement and tie-down engagement heads;

said tie-down tensioner being characterized in that the drive mechanism comprises the following two distinct parts:

a self-centering crown floatingly supported in the hollow body of the tie-down engagement head for rotating the latter when the self-centering crown is rotated, said self-centering crown having a toothing on its inner periphery; and a gear attached to the ratchet engagement head and mounted in the self-centering crown, said gear having a toothing on its outer periphery designed to engage with the toothing of the self-centering crown in order to rotate it when the gear rotates in the tensioning direction and to slide over the toothing of the self-centering crown without rotating it when the gear rotates in the return to initial position direction;

and in that:

at least one of the toothings is formed by curved spring blades extending substantially following the periphery on which said toothing is situated, each spring blade having a tooth at its free end provided in order for the toothing of the gear to mesh with the toothing of the self-centering crown.

According to one exemplary embodiment of the invention, one of the following facts applies:

the inner toothing of the self-centering crown is formed from inclined teeth and the outer toothing of the gear is formed from spring blades;

the inner toothing of the self-centering crown is formed from spring blades and the outer toothing of the gear is formed from inclined teeth; or the inner toothing of the self-centering crown and the outer toothing of the gear are formed from spring blades.

According to another exemplary embodiment of the invention, the ratchet engagement head, the tie-down engagement head, the self-centering crown and the gear are centered around the same longitudinal axis of rotation.

According to an additional exemplary embodiment of the invention, the tie-down tensioner comprises a translational stop device which connects the ratchet engagement head, the tie-down engagement head, the self-centering crown and the gear in order to prevent them from becoming detached along the longitudinal axis of rotation of the tie-down tensioner.

According to one exemplary embodiment of the invention, the translational stop device comprises a screw associated with a nut, or a rod associated with an elastic ring.

According to another exemplary embodiment of the invention, the body of the tie-down engagement head has one or more access windows in order to allow a part of the translational stop device to be installed. These access windows advantageously allow access, for example, to the nut or to the elastic ring when the winding shaft is secured to the tie-down engagement head.

According to an additional exemplary embodiment of the invention, the body of the tie-down engagement head has two access windows provided facing each other, which facilitates the positioning of the nut or of the elastic ring.

According to one exemplary embodiment of the invention, one of the following facts applies:

the translational stop device comprises a rod having at least one shoulder formed on its body, and a key intended to be inserted through an access window, coming into immobilizing abutment against a shoulder formed on the body of the rod; or the translational stop device comprises a rod having two opposing shoulders formed on its body, and a clip in the form of a stirrup intended to be inserted through an access window and to grip the two shoulders formed on the body of the rod.

This is an advantageous alternative for replacing a screw associated with a nut.

According to another exemplary embodiment of the invention, the self-centering crown has, on its outer periphery, engagement shapes complementary to engagement shapes provided in the inner periphery of the hollow body of the tie-down engagement head, these engagement shapes allowing mutual rotational play between the self-centering crown and the tie-down engagement head so that they are not in a tight fit.

According to an additional exemplary embodiment of the invention, the self-centering crown has male engagement shapes on its outer periphery and the tie-down engagement head has complementary female engagement shapes in the inner periphery of its hollow body.

According to one exemplary embodiment of the invention, the ratchet engagement head has a circular contact surface designed to come into sealing contact against a circular contact surface of the tie-down engagement head.

According to another exemplary embodiment of the invention, sealing between the two circular contact surfaces is obtained by complementary circular baffles formed in said circular contact surfaces, by an O-ring housed between said circular contact surfaces, and/or by a scraper provided between said circular contact surfaces.

According to an additional exemplary embodiment of the invention, at least one of the following facts applies:

the end tooth of each spring blade of the gear is curved radially outwards and has a convex domed surface on its inner face; and/or the end tooth of each spring blade of the self-centering crown is curved radially inwards and has a convex domed surface on its outer face.

According to one exemplary embodiment of the invention, the gear is mounted on the ratchet engagement head via recessed and/or raised profiles of complementary shapes provided in the gear and on the ratchet engagement head.

According to another exemplary embodiment of the invention, the gear has a non-circular central through-opening for mounting it on a male part of complementary shape of the ratchet engagement head.

According to an additional exemplary embodiment of the invention, at least one profile is in the form of a hexagonal head, a Torx® screw (having a six-pointed star shaped head), a flat, a square head, a key or a spline.

According to one exemplary embodiment of the invention, the self-centering crown and/or the gear has/have at least three spring blades distributed over the inner periphery of the self-centering crown and/or over the outer periphery of the gear.

The advantages of the present invention are particularly numerous.

In general, compared with existing conventional ratchet mechanisms, the ratchet tie-down tensioner according to the invention comprises a small number of parts, which allows a lower manufacturing cost and a rapid assembly of the system.

By virtue of a second ratchet function, the ratchet tie-down tensioner according to the invention makes it possible to return the tensioning bar to the initial position in order to start a new tensioning cycle without having to remove it from its cavity, this second ratchet function being obtained inside the tie-down tensioner by the spring effect of the spring blades which, depending on the direction of rotation, slide over or drive the inner teeth of the self-centering crown to respectively allow the tie-down engagement head to return to the initial position or tension it.

Due the robustness of its constituent means, the ratchet tie-down tensioner according to the invention makes it possible to accommodate high torque in a very small space requirement. It allows a high tensioning or loosening torque.

The gear and the self-centering crown are reversible, which makes it possible to use these same parts to design a ratchet tie-down tensioner intended to operate in another direction of rotation. The term "reversible" should be understood to refer to the fact that, depending on the direction of use, it is possible to invert the assembly formed by the gear and the self-centering crown and thus to use these parts regardless of the direction of use without needing to modify them. On the other hand, for each of the two directions of use of the ratchet tie-down tensioner, two models of ratchet engagement head are provided, a right-hand one and a left-hand one, depending on the orientation of the outer inclined teeth of the tie-down engagement head.

The gear and self-centering crown may be manufactured from different materials to the ratchet engagement head and the tie-down engagement head. Thus, for example, the gear and the self-centering crown may be manufactured from very hard treated steels, whereas the ratchet engagement head and the tie-down engagement head are preferably castings made from common alloys.

The gear and the self-centering crown are wear parts that can be replaced easily. Since they can be manufactured by laser cutting, these parts can be manufactured at low cost, whereas the engagement heads are castings, which are robust and designed to last, but also far more expensive.

Advantageously, the floating assembly of the self-centering crown in the hollow body of the tie-down engagement head helps avoid overstressing the gear. Indeed, due to slight imperfections during the manufacture of the parts, the axis of rotation of the gear and that of the ratchet engagement head may, for example, not be perfectly identical, but slightly offset. This is particularly true if, for price reasons, the ratchet engagement head and the tie-down engagement head are rough castings. This helps ensure that the spring blades of the gear are isostatic with respect to the inner teeth of the self-centering crown. Thus, the floating assembly of the self-centering crown in the tie-down engagement head helps compensate for this slight offset in such a way that the gear is correctly centered with respect to the tie-down engagement head.

Generally, the drive mechanism includes at least three spring blades that make the system isostatic.

The length of the spring blades helps limit the bending stresses during the repeated deformations caused by passing from one tooth to the next. As a result, these blades, which work in compression when under tension, are subject to buckling. The geometry of these blades is therefore designed in such a way that they come into abutment against the tops of the teeth, thus limiting buckling. Self-centering is necessary for this anti-buckling abutment to take place, given that the parts are rough and not machined, for cost reasons.

Thus, the topology of the blades of the gear is optimized by finite element analysis in order to be able to absorb the stresses induced by tensioning and allow the buckling of the spring blades to be controlled by allowing them to abut against the inner teeth of the self-centering crown.

The shape of the end teeth of the flexible blades advantageously has an angle of engagement defined such that said end teeth do not slip over the inner teeth of the self-centering crown and such that the gear and the self-centering crown engage in an optimum manner in the torque transmission position.

The sealing between the contact surfaces of the ratchet engagement head and the tie-down engagement head advantageously prevents the external environment from infiltrating into the tie-down tensioner. Drainage through-holes may also be provided in the hollow body of the tie-down engagement head in order to allow any undesirable elements that may have penetrated into the tie-down tensioner to drain out.

BRIEF DESCRIPTION OF THE DRAWINGS

Other characteristics and advantages of the present invention will be more clearly understood from the description below, made with reference to the accompanying drawings given by way of non-limiting examples, in which:

FIG. 3 is a front perspective view of a tie-down tensioner according to a first variant of the invention and shown as an exploded view;

FIG. 4 is a rear perspective view of the tie-down tensioner shown in FIG. 3;

DETAILED DESCRIPTION

Structurally and functionally identical elements present in several distinct figures are provided with the same numerical or alphanumerical reference. The term "toothing" should be understood here to mean the toothed portion of a mechanical part.

Figure 1:
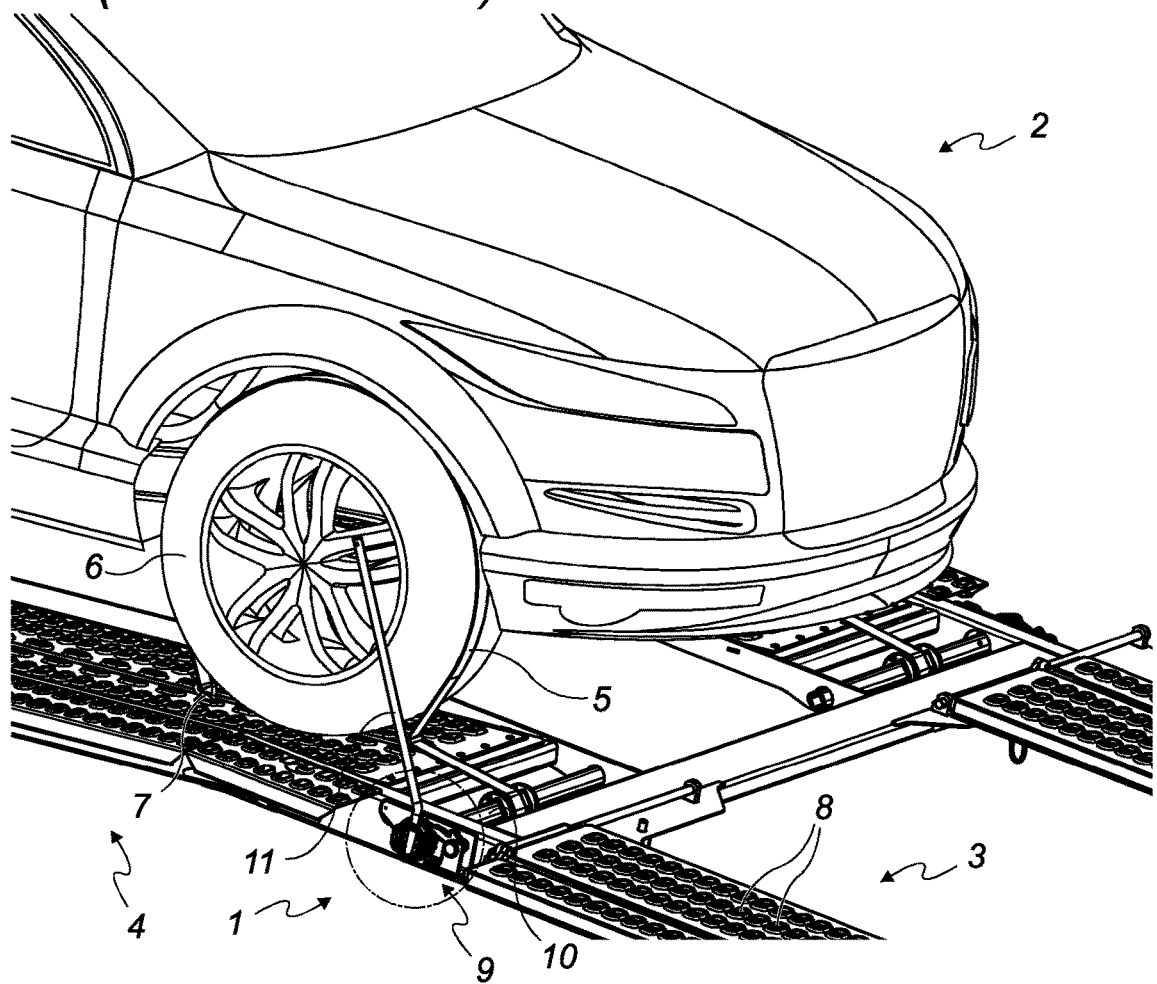
FIG. 1 is a perspective view of a strap tensioner tie-down system of the prior art used to tie down the wheel of a motor vehicle on the platform of a car-carrying vehicle.
Figure 2:
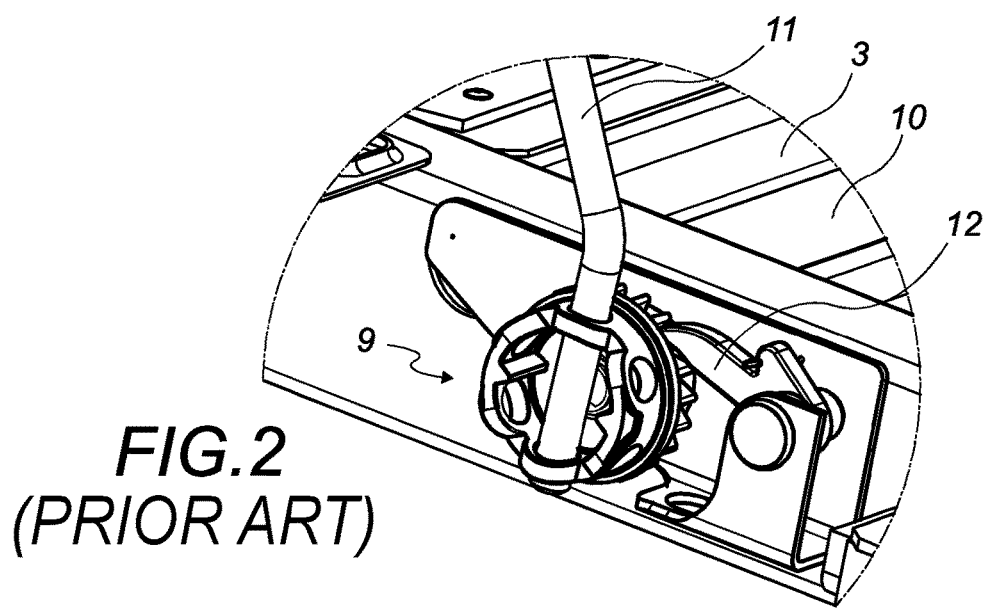
FIG. 2 is a detailed view of the circled portion of FIG. 1.
Figure 5:
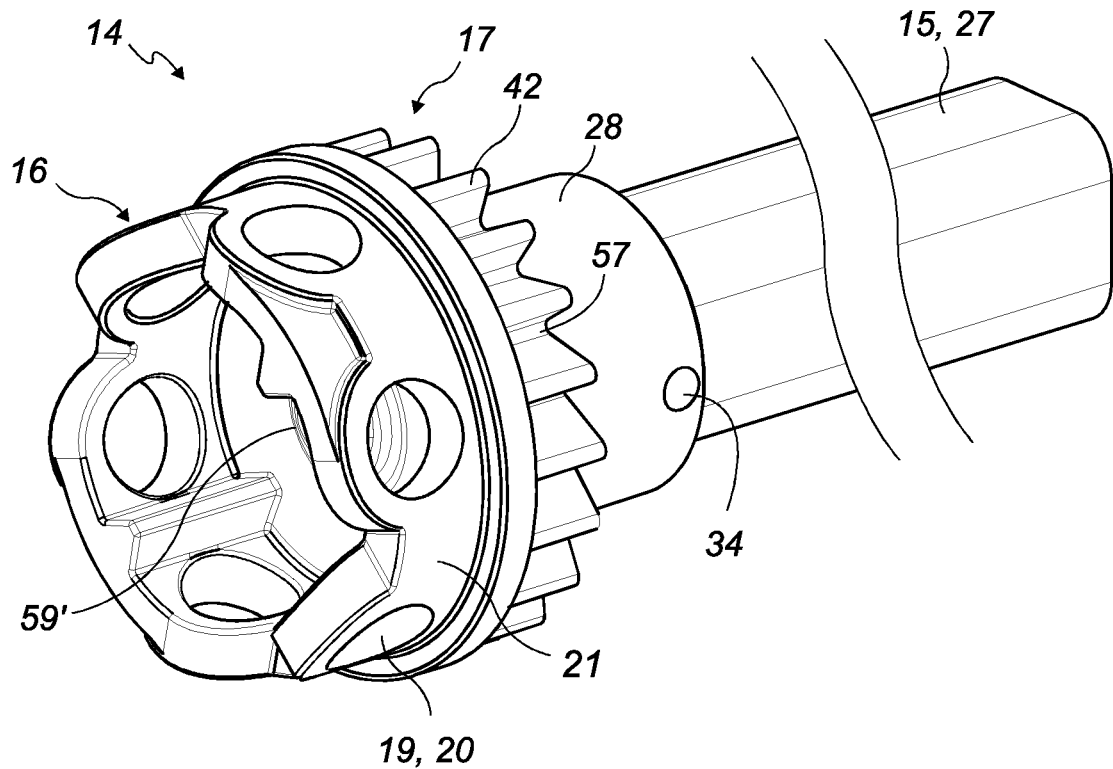
FIG. 5 is a front perspective view of a tie-down tensioner according to the invention shown assembled.
Figure 6:
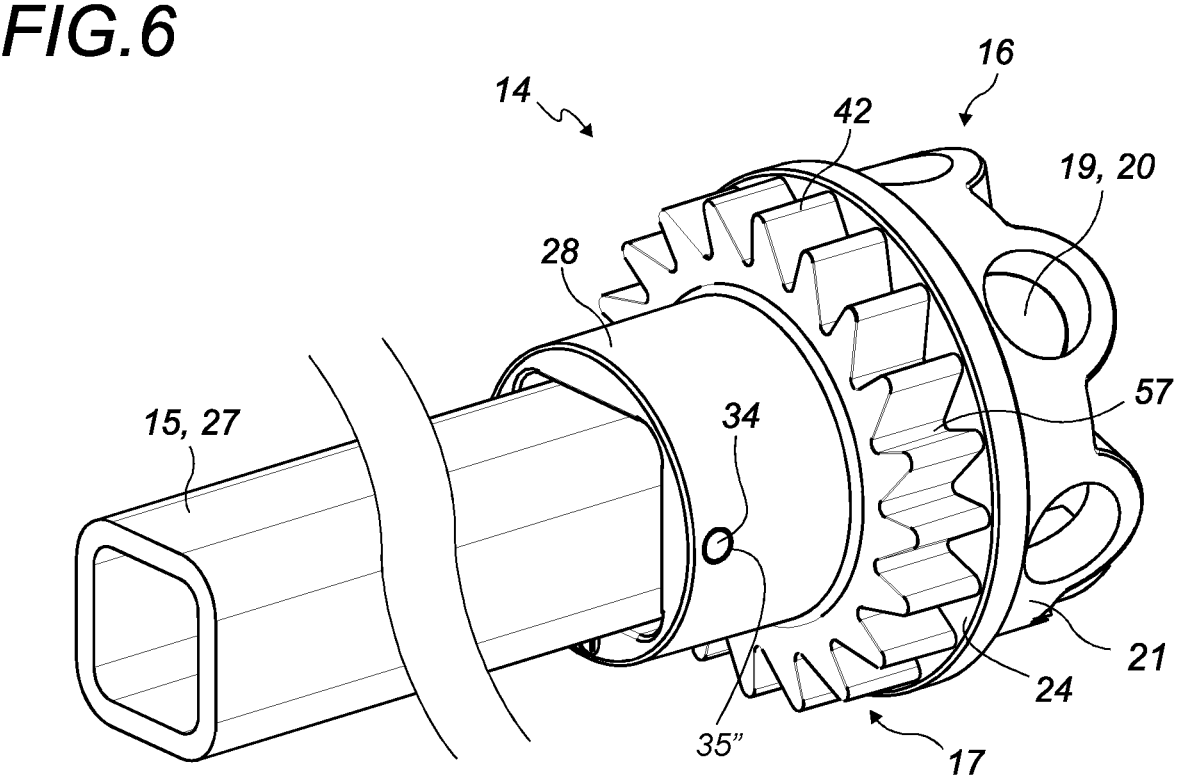
FIG. 6 is a rear perspective view of a tie-down tensioner according to the invention shown assembled.

FIGS. 1 and 2 show a tie-down system (1) according to the prior art, serving to secure a car (2) to the platform (3) of a car-carrying vehicle (4) by means of a strap (5) passed around a tire (6) and attached by a hook (7) at its free end to the holes (8) in the platform (3) of the car-carrying vehicle (4). In this tie-down system (1), the strap (5) is wound by a ratchet strap tensioner (9) around a lashing drum (10) actuated by means of a tensioning bar (11). The advantage of this tie-down system (1) is its unidirectional design, which makes it easy to resume tensioning. Indeed, when the strap tensioner (9) is actuated in one direction, the operator can tension the strap (5). Then, when it releases the force, a pawl (12)—in this instance of the pivoting finger type and forming part of the tie-down system (1)—prevents the strap tensioner (9) from rotating and keeps the strap (5) taut.

The tie-down system (13) according to the invention comprises a ratchet tie-down tensioner (14), a winding shaft (15) for a tie-down and a tensioning bar (11), the latter possibly being similar to that of the prior art. This tie-down system (13) is characterized by its tie-down tensioner (14) which allows a tie-down to be tensioned.

The term "tie-down" should be understood here to mean any type of long attachment or flexible tie, for example a strap, a cable or a chain, which makes it possible, for example, to secure a vehicle to a loading platform by passing said tie-down around a tire of the vehicle, attaching it to the holes in the deck of the car carrier and tensioning it. In FIGS. 1 and 2, which show the prior art, this tie-down is in the form of a strap (5).

The tie-down tensioner (14) according to the invention comprises a ratchet engagement head (16), a tie-down engagement head (17), a ratchet drive mechanism (18) located between the ratchet engagement and tie-down engagement heads (17, 18), and a pawl (12).

The ratchet engagement head (16) is designed to be associated with a tensioning bar (11), said tensioning bar (11) making it possible to rotate the ratchet engagement head (16) when it is actuated, in a first direction referred to as the "tensioning" direction (S) and in the opposite direction referred to as the "return to initial position" direction (R).

The tensioning bar (11) is preferably removable. However, it may be fixed or secured to the ratchet engagement head (16) or may be integral therewith, for example in the manner of a ratchet wrench.

When the tensioning bar (11) is removable, the ratchet engagement head (16) preferably has a plurality of coupling shapes (19) for connecting the tensioning bar (11) to the ratchet engagement head (16) in order to rotate it. These coupling shapes (19) may be in the form of openings (20) or cavities distributed around the outer periphery of the ratchet engagement head (16).

The ratchet engagement head (16) preferably has a hollow body (21) open at the front face (22) and at least partially closed at the rear face (23) so that said rear face (23) has a circular contact surface (24).

The ratchet engagement head (16) preferably has a central through-opening (25) which extends through the ratchet engagement head (16) along the longitudinal axis of rotation (A) of the tie-down tensioner (14).

Said rear face (23) also has a recessed and/or raised profile (26), preferably male, for example in the form of a hexagonal head, a Torx® screw, a flat, a square head, a key or a spline.

The tie-down engagement head (17) is designed to be associated with a tie-down winding shaft (15) around which the tie-down is wound when the tie-down tensioner (14) according to the invention is actuated in the tensioning direction (S). This tie-down winding shaft (15) is preferably in the form of a tube (27), for example having a polygonal cross-section.

This tie-down winding shaft (15) is preferably removable. However, it may be fixed or secured to the tie-down engagement head (17) or may be integral therewith.

The tie-down engagement head (17) preferably has a hollow, preferably cylindrical body (28), the front face (29) of which is open in order to form a cavity (30) for the ratchet drive mechanism (18), said cavity (30) being bordered by a rim forming a circular contact surface (31) intended to come into contact against the circular contact surface (24) of the ratchet engagement head (16).

The body (28) of the tie-down engagement head (17) has a rear face (32) intended to be associated with the tie-down winding shaft (15). When the tie-down winding shaft (15) is in the form of a tube (27), said rear face (32) preferably has a cavity (33) of a shape complementary to that of the tube (27) in order to receive one end thereof. Said end of the tube (27) is preferably held in place in the cavity (33) by inserting a pin (34), a dowel, a screw, or any other similar means, through a series of coaxial through-openings (35' and 35") extending transversely respectively through the body (28) of the tie-down engagement head (17) and the tube (27).

Figure 7:
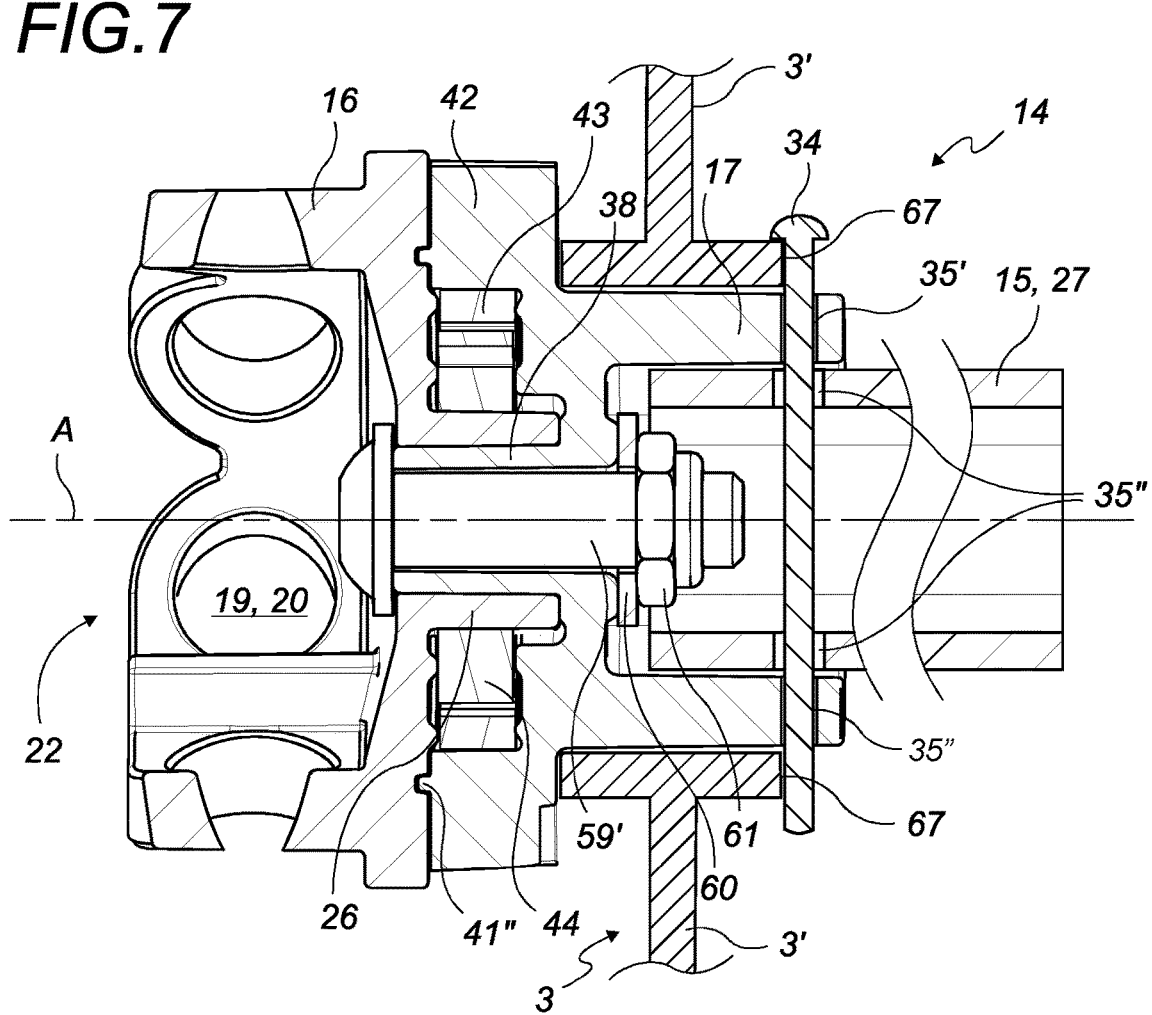
FIG. 7 is a vertical cross-sectional view of a tie-down tensioner according to the first variant of the invention.
Figure 8:
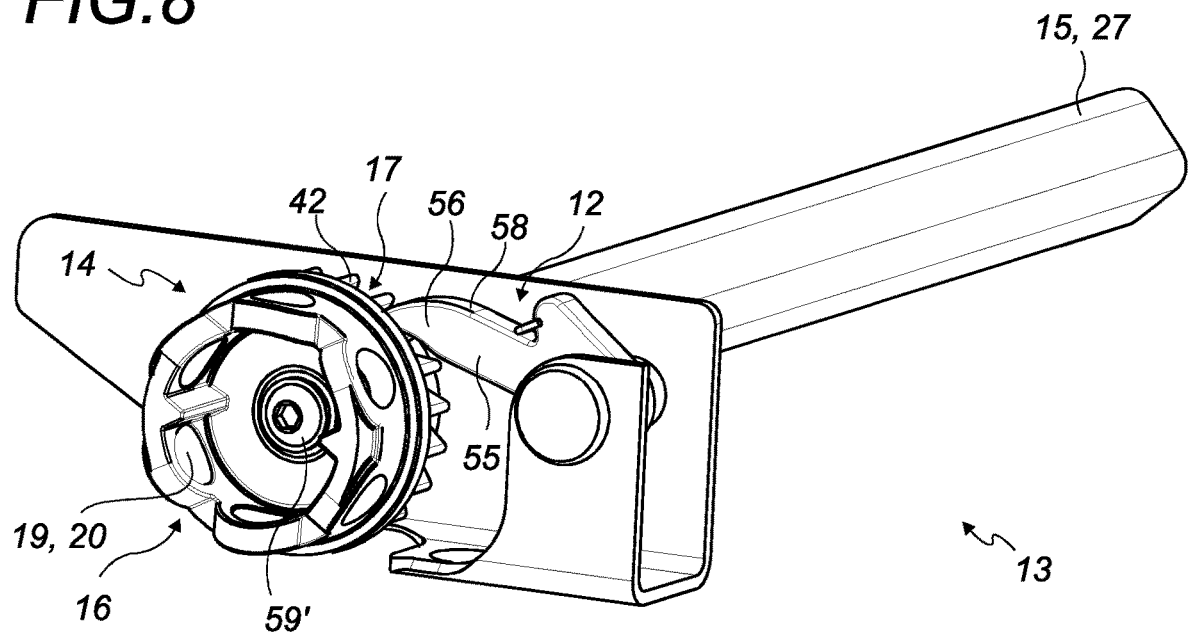
FIG. 8 is a perspective view of a tie-down system according to the invention.
Figure 9:
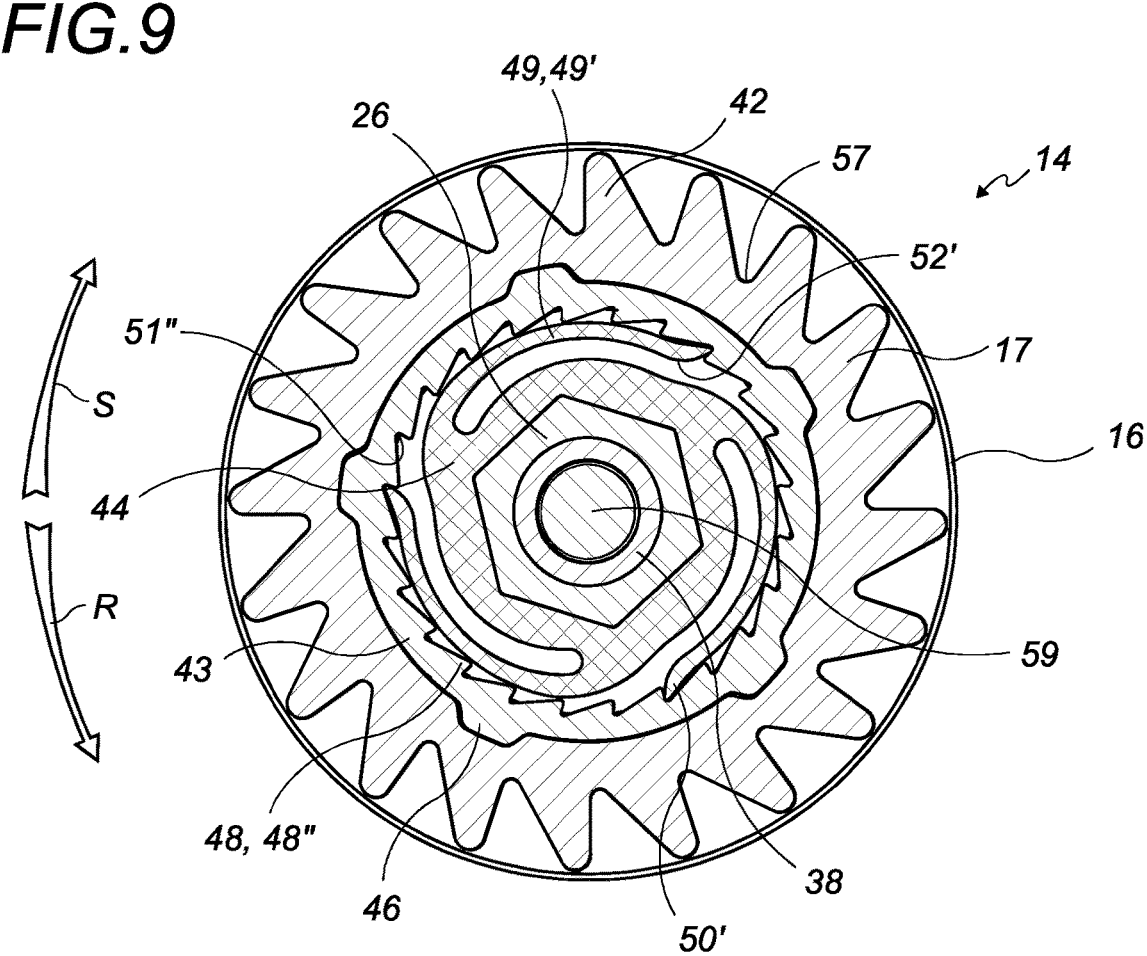
FIG. 9 is a vertical cross-sectional view of the tie-down tensioner according to the first variant of the invention.

Advantageously, as shown in FIG. 7, this pin (34), dowel, screw, or other similar means also makes it possible to hold the tie-down tensioner (14) on the chassis (3') on which it is mounted, for example on the platform (3) of a car-carrying vehicle (4). This holding on said chassis (3') is effected, for example, by a first bearing contact of the flanks of sloping teeth (42) of the tie-down engagement head (17) against one flank of said chassis (3'), and by a second bearing contact of the pin (34), dowel, screw, or other similar means against the other flank of the chassis (3'). This pin (34), dowel, screw, or other similar means constitutes a means for preventing the tie-down tensioner (14) and the winding shaft (15) from moving in translation with respect to the chassis (3').

Preferably, the cavity (30) for the ratchet drive mechanism (18) has at least one drainage through-opening (36) which opens, for example, in the rear face (32), so that any undesirable external elements which may be present in the cavity (30) can be removed easily. This at least one drainage through-opening (36) is preferably off-center and extends through the cavity (33) for the tube (27) along the longitudinal axis of rotation (A) of the tie-down tensioner (14).

The tie-down engagement head (17) preferably has a central through-opening (37) which extends along the longitudinal axis of rotation (A) of the tie-down tensioner (14). At the rear face (32), this central through-opening (37) preferably opens into the bottom of the cavity (33) for the tube (27). At the front face (29), this central through-opening (37) is bordered by a sleeve (38) which opens, for example, at the circular contact surface (31) outside the cavity (30) for the drive mechanism (18). When the tie-down tensioner (14) according to the invention is assembled, the rim (39) of the free end of said sleeve (38) preferably comes into sealing contact against the front surface of the profile (26) of the ratchet engagement head (16). In order to improve this seal, the profile (26) of the ratchet engagement head (16) preferably has a circular receiving cup (40) for the free end of the sleeve (38).

When the tie-down tensioner (14) according to the invention is assembled, the circular contact surface (22) of the ratchet engagement head (16) and that (31) of the tie-down engagement head (17) are also intended to come into sealing contact with each other, so that the ratchet drive mechanism (18) housed between the ratchet engagement and tie-down engagement heads (16, 17) is protected from the outside. In order to improve this seal, the two circular contact surfaces (22, 31) may, for example, have circular baffles (41', 41") of complementary shapes designed to engage with each other, one of these circular baffles (41', 41") being able, for example, to be in the form of a ring while the other is in the form of a complementary groove. An O-ring and/or scraper may also be provided between said circular contact surfaces (22, 31).

On the outer periphery of its body (28), the tie-down engagement head (17) has inclined teeth (42) intended to be engaged with the pawl (12) so that said pawl (12) allows the tie-down engagement head (17) to rotate in the tensioning direction (S) and prevents it from rotating in the return to initial position direction (R). The inclined teeth (42) are preferably located at the front face (29) of the tie-down engagement head (17), at the same height on the cavity (30) for the ratchet drive mechanism (18).

The inclined teeth (42) of the tie-down engagement head (17) are inclined in the return to initial position direction (R).

The cavity (30) for the drive mechanism (18) is closed at the front face by the rear face (23) of the ratchet engagement head (16).

The drive mechanism (18) is located between the ratchet engagement head (16) and the tie-down engagement head (17), preferably in the cavity provided in the body (28) of the tie-down engagement head (17)

The drive mechanism (18) is designed such that the ratchet engagement head (16) and the tie-down engagement head (17) rotate together in the tensioning direction (S) when the ratchet engagement head (16) is rotated in the tensioning direction (S) and such that the ratchet engagement head (16) rotates alone without rotating the tie-down engagement head (17) when the ratchet engagement head (16) is rotated in the return to initial position direction (R).

Figure 10:
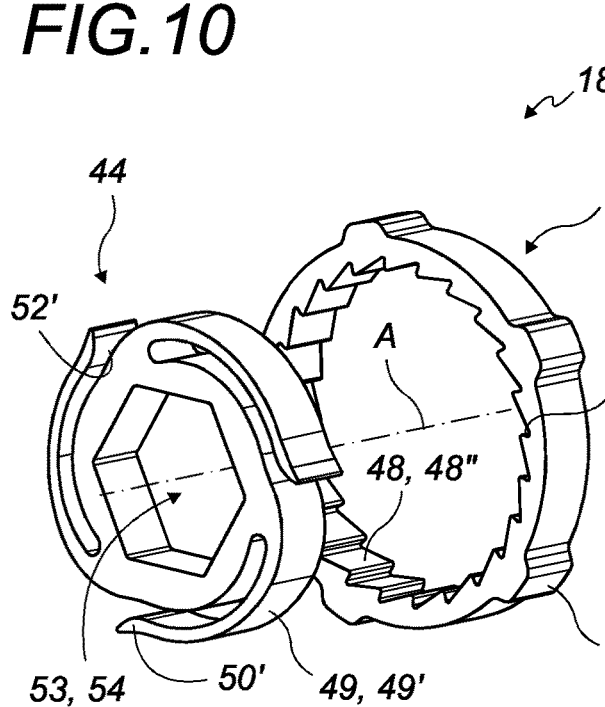
FIG. 10 is a perspective view showing the mounting of a gear in a self-centering crown according to the first variant of the invention.
Figure 11:
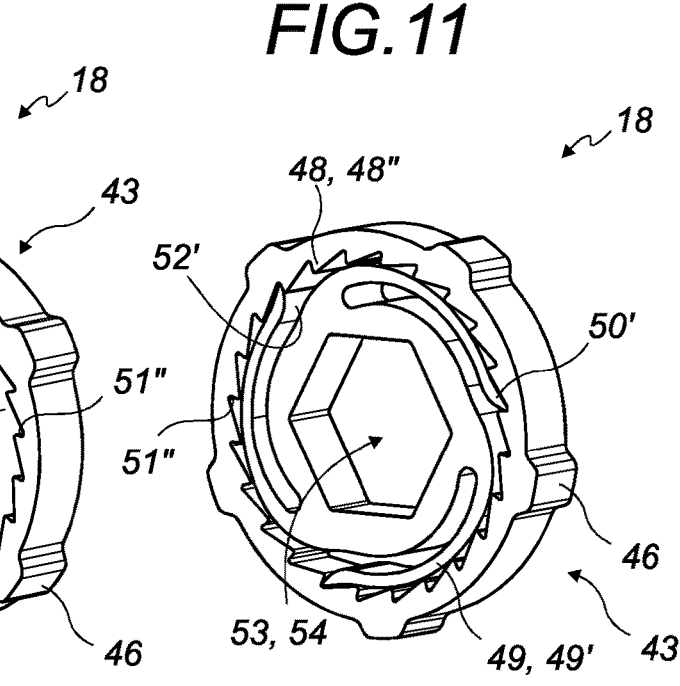
FIG. 11 is a perspective view showing a gear mounted in a self-centering crown according to the first variant of the invention.

As shown in FIGS. 10 and 11, the drive mechanism (18) comprises a self-centering crown (43) and a gear (44), these two parts (43, 44) being separate and assembled together to form the ratchet drive mechanism (18).

The self-centering crown (43) has a generally annular body with a substantially central circular empty space (45).

On its outer periphery, the self-centering crown (43) comprises engagement shapes (46) which are complementary to engagement shapes (47) provided in the inner periphery of the body (28) of the tie-down engagement head (17). These engagement shapes (46, 47), which may, for example, be five in number, are designed such that, when the self-centering crown (43) is rotated, it also rotates the tie-down engagement head (17). A small free space is provided between said engagement shapes (46, 47) so that the self-centering crown (43) is floatingly supported in the hollow body (28) of the tie-down engagement head (17). There is thus mutual rotational play between the self-centering crown (43) and the tie-down engagement head (17) so that these two parts are not in a tight fit. This clearance is, for example, approximately 0.5 millimeters.

On its inner periphery, the self-centering crown (43) comprises a toothing (48) intended to drive it in rotation. The raised shapes of this toothing (48) are inclined in the return to the initial position direction (R).

As described below, the inner toothing (48) of the self-centering crown (43) may be formed from spring blades (48') or inclined teeth (48").

The gear (44) has a generally annular body. It is intended to be housed in the circular empty space (45) of the self-centering crown (43).

On its outer periphery, the gear (44) has a toothing (49) designed to engage with the toothing (48) of the self-centering crown (43) in order to rotate it when the gear (44) rotates in the tensioning direction (S) and to slide over the toothing (48) of the self-centering crown (43) without rotating it when the gear (44) rotates in the return to initial position direction (R). The raised shapes of the toothing (49) of the gear (44) are inclined in the tensioning direction (S).

As described below, the outer toothing (49) of the gear (44) may be formed from spring blades (49') or inclined teeth (49''').

The inner toothing (48) of the self-centering crown (43) and/or the outer toothing (49) of the gear (44) is formed by spring blades (48', 49'), so that at least one of the toothings (48, 49) of these two parts (43, 44) is formed by spring blades (48', 49').

These spring blades (48', 49') are curved and extend substantially following the periphery on which said toothing (48, 49) is situated, i.e., the general curve of the spring blades (48', 49') substantially forms a circle concentric and parallel to the inner periphery of the self-centering crown (43) and the outer periphery of the gear (44).

In other words, the fact that the spring blades (48', 49') are curved and extend substantially following the periphery on which they are situated, should be understood to mean that the spring blades (48', 49') each extend at a distance from said periphery, substantially around the same circle within the same toothing (48, 49), this circle being homocentric with the circular or polygonal periphery on which the spring blades (48', 49') are situated.

The spring blades (48', 49') are blades whose length gives them a certain elasticity and whose material, which is preferably metal, allows them to return to the initial position after being deformed.

Each spring blade (48', 49') has a tooth (50', 50") at its free end provided in order for the toothing (49) of the gear (44) to mesh with the toothing (48) of the self-centering crown (43).

According to a first variant of the invention, shown in FIGS. 3, 4, 7 and 9 to 11, the inner toothing (48) of the self-centering crown (43) is formed from inclined teeth (48") and the outer toothing (49) of the gear (44) is formed from spring blades (49').

Figure 12:
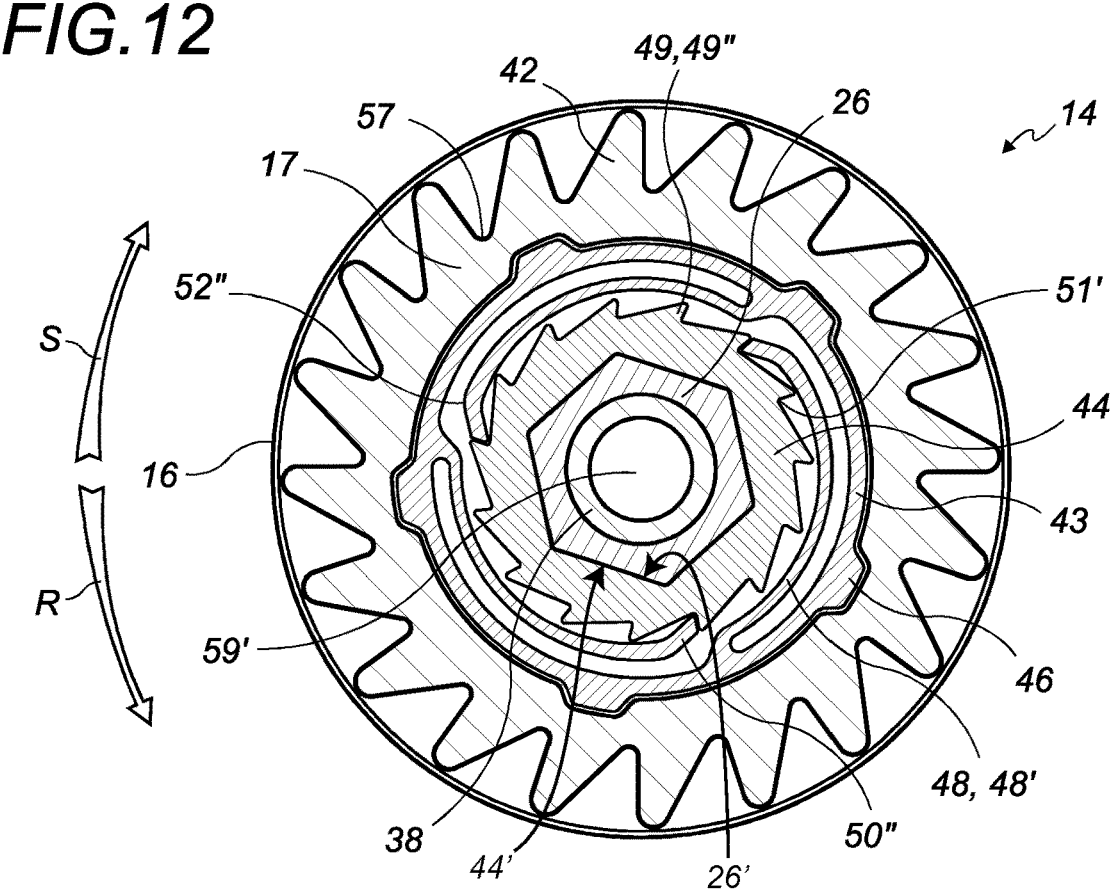
FIG. 12 is a vertical cross-sectional view of the tie-down tensioner according to a second variant of the invention.

According to a second variant of the invention, shown in FIG. 12, the inner toothing (48) of the self-centering crown (43) is formed from spring blades (48') and the outer toothing (49) of the gear (44) is formed from inclined teeth (49''').

Figure 13:
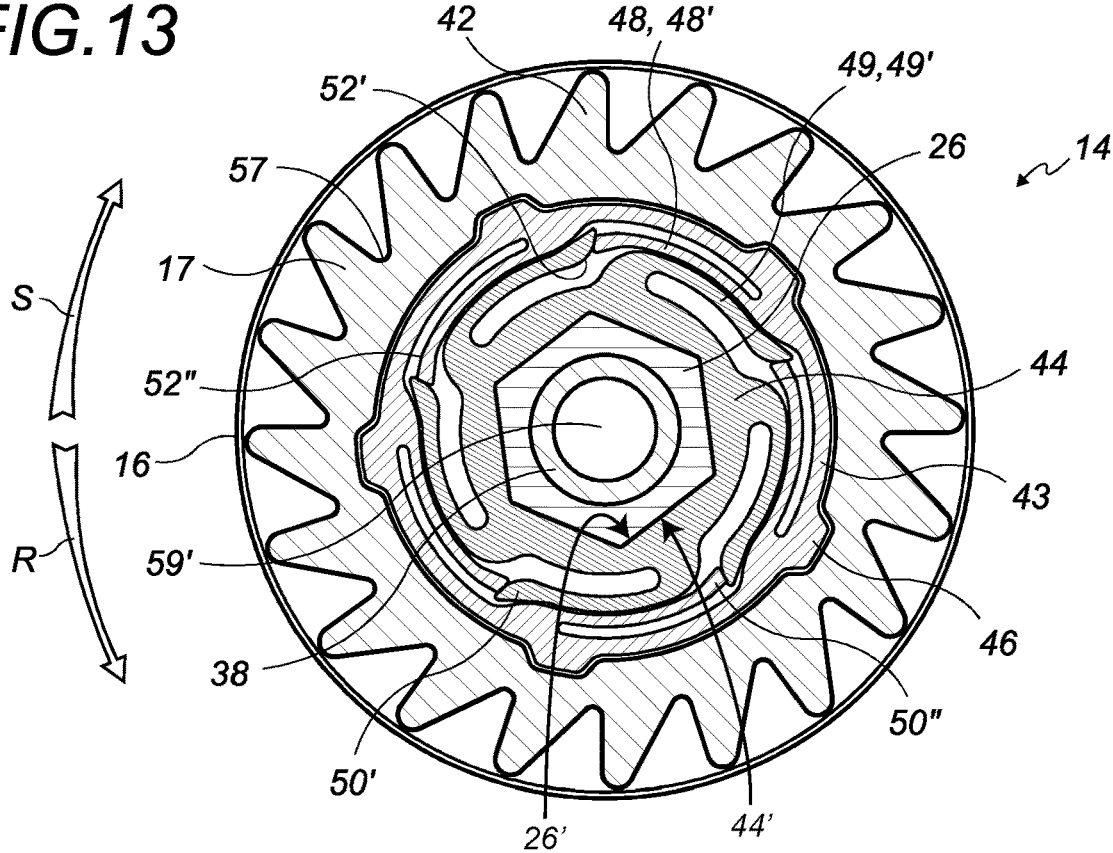
FIG. 13 is a vertical cross-sectional view of the tie-down tensioner according to a third variant of the invention.

Finally, according to a third variant of the invention, shown in FIG. 13, the inner toothing (48) of the self-centering crown (43) and the outer toothing (49) of the gear (44) are both formed from spring blades (48', 49').

When one of these parts is equipped with spring blades (48', 49'), the self-centering crown (43) and the gear (44) each have at least three spring blades (48', 49'), preferably distributed in a uniform manner over their periphery, namely over the inner periphery of the self-centering crown (43) and over the outer periphery of the gear (44).

The end tooth (50') of each spring blade (49') of the gear (44) is curved radially outwards and has a convex domed surface (52') on its inner face. According to the first variant of the invention, each of these end teeth (50') is designed to engage in a tooth root (51") of the inner inclined teeth (48") of the self-centering crown (43) in order to rotate said self-centering crown (43) when the gear (44) rotates in the tensioning direction (S).

Similarly, the end tooth (50") of each spring blade (48') of the self-centering crown (43) is curved radially inwards and has a convex domed surface (52") on its outer face. According to the second variant of the invention, each of these end teeth (50") is intended to engage in a tooth root (51') of the outer inclined teeth (49''') of the gear (44) in order to rotate the self-centering crown (43) when said gear (44) rotates in the tensioning direction (S).

According to the third variant of the invention, the end teeth (50") of the spring blades (48') of the self-centering crown (43) are designed to come into rotational driving contact with the end teeth (50') of the spring blades (49') of the self-centering crown (43) in order to rotate the self-centering crown (43) when said gear (44) rotates in the tensioning direction (S).

It should be noted that the spring blades (48') of the self-centering crown (43) extend in the return to initial position direction (R) from the outer periphery of the self-centering crown (43), while the spring blades (49') of the gear (44) extend in the tensioning direction (S) from the outer periphery of the gear (44).

As can be seen in the figures, the inner toothing (48) of the self-centering crown (43) is preferably integral with the body of said self-centering crown (43), and the outer toothing (49) of the gear (44) is preferably integral with the body of said gear (44).

Thus, the spring blades (48', 49') are preferably formed integrally with the body of the self-centering crown (43) or with the body of the gear (44).

The convex domed surface (52', 52") of the end teeth (50', 50") of the spring blades (48', 49') is intended to facilitate the sliding of the outer toothing (49) of the gear (44) over the inner toothing (48) of the self-centering crown (43), without rotating it, when the gear (44) rotates in the return to initial position direction (R).

This sliding of the spring blades (48', 49') over the inclined teeth (49''', 48") (in the first and second variants), or the mutual sliding of the spring blades (48', 49') over each other (in the third variant) is also facilitated by the flexible and radially deformable nature of the spring blades (48', 49').

In general, the shape of the spring blades (49), in particular their angle of engagement and their angle of disengagement, is designed for optimum torque transmission between the outer toothing (49) of the gear (44) and the inner toothing (48) of the self-centering crown (43) when the gear (44) rotates in the tensioning direction (S), and for free rotation of the outer toothing (49) of the gear (44) with respect to the inner toothing (48) of the self-centering crown (43), without the risk of the spring blades (48', 49') becoming jammed with each other or with the inclined teeth (49''', 48") when the gear (44) rotates in the return to initial position direction (R).

In order to mount it on the ratchet engagement head (16), the gear (44) has a recessed and/or raised profile (53), preferably female, of complementary shape (26', 44') to the recessed and/or raised profile (26) of the ratchet engagement head (16). The recessed and/or raised profile (53) of the gear (44) preferably has a non-circular central through-opening (54). It may be in the form of a hexagonal head, a Torx® screw, a flat, a square head, a key or a spline.

In order to prevent the gear (44) from being mounted in the wrong direction on the ratchet engagement head (16), a foolproofing system may be provided in the recessed and/or raised profiles (26, 53) of the ratchet engagement head (16) and the gear (44), or the recessed and/or raised profiles (26, 53) may have a specific shape which allows them to engage with each other only in one direction.

The gear (44) is preferably tightly fitted to the ratchet engagement head (16) by mutual engagement of their respective profiles (26, 53).

According to one variant of the invention, the ratchet engagement head (16) may be integral with the gear (44).

The pawl (12) of the tie-down tensioner (14) according to the invention is of conventional design. It may be a radial or axial pawl.

The pawl (12) may, for example, be in the form of a pivoting finger (as shown in the figures), a spring blade or any other type of pawl designed to mesh with the inclined teeth (42) of the tie-down engagement head (17) in order to allow it to rotate in the tensioning direction (S) and to prevent it from rotating in the return to initial position direction (R).

Conventionally, the pawl (12) is mounted in the immediate vicinity of the ratchet engagement head (16), for example on the platform (3) of a car-carrying vehicle (4).

When it is in the form of a pivoting finger, the pawl (12) is preferably in the form of an elongate body (55) mounted in such a way as to be able to pivot at one end and having an engagement tooth (56) designed to engage in a tooth root (57) of the outer inclined teeth (42) of the tie-down engagement head (17) when said tie-down engagement head (17) rotates in the return to initial position direction (R).

In its face turned towards the tie-down engagement head (17), the engagement tooth (56) of the pawl (12) has a concave curved surface (58) under which the outer inclined teeth (42) of the tie-down engagement head (17) slide when the tie-down engagement head (17) rotates in the tensioning direction (S), so that the tie-down engagement head (17) can rotate freely in the tensioning direction (S).

The tie-down tensioner (14) according to the invention preferably comprises a translational stop device which connects the ratchet engagement head (16), the tie-down engagement head (17), the self-centering crown (43) and the gear (44) in order to prevent them from becoming detached along the longitudinal axis of rotation (A) of the tie-down tensioner (14).

This translational stop device preferably comprises a screw (59') associated with a nut (61) and possibly with a washer (60), or a rod (59") associated with an elastic ring or with another immobilization device. The body of said screw (59') or rod (59") is preferably inserted through the central through-opening (25) of the ratchet engagement head (16), the central through-opening (54) of the gear (44), the circular empty space (45) of the self-centering crown (43) and the central through-opening (37) of the tie-down engagement head (17).

When the tie-down tensioner (14) according to the invention is assembled, a part of the translational stop device can be housed in the tie-down winding shaft (15). In FIGS. 1 to 14 and 17, it is the washer (60), the nut (61) and the free end of the screw (59'). In FIGS. 15, 16 and 18 to 21, it is a key (65) or a clip (66), which are described below, and the free end of the rod (59").

In the embodiments of the invention shown in FIGS. 3 to 13, the winding shaft (15) is fixed to the tie-down engagement head (17) and the end of the tube (27) is preferably held in place in its cavity (33) by inserting a pin (34), a dowel, a screw, or any other similar means. However, when mounting a tie-down system (13) on the chassis (3') of a platform (3) of the car-carrying vehicle, access to the pin (34) or other similar means is not always easy, and it is possible for the latter to fall out and for the tie-down engagement head (17) to become detached from the tube (27), such that the tie-down system (13) is no longer retained and is liable to fall off.

According to an alternative embodiment of the invention shown in FIGS. 14 to 23, the winding shaft (15) is secured to the tie-down engagement head (17), for example by welding, gluing or brazing, or is integral therewith, thus forming a single assembly (62) formed by a winding shaft (15) comprising a tie-down engagement head (17) at one of its ends, which prevents the tie-down engagement head (17) from becoming detached from the tube (27).

It should be noted that, according to this alternative embodiment of the invention, it is not necessary for the winding shaft (15) to have a polygonal cross-section. Thus, in FIGS. 14 to 23, the winding shaft (15) is shown by way of example in the form of a tube (27) with a round cross-section. Naturally, the winding shaft (15) may be in any shape.

However, according to this alternative embodiment of the invention, it is difficult to gain access to the nut (61) or to the elastic ring of the translational stop device which connects the ratchet engagement head (16), the tie-down engagement head (17), the self-centering crown (43) and the gear (44) in order to prevent them from becoming detached along the longitudinal axis of rotation (A) of the tie-down system (13).

Figure 14:
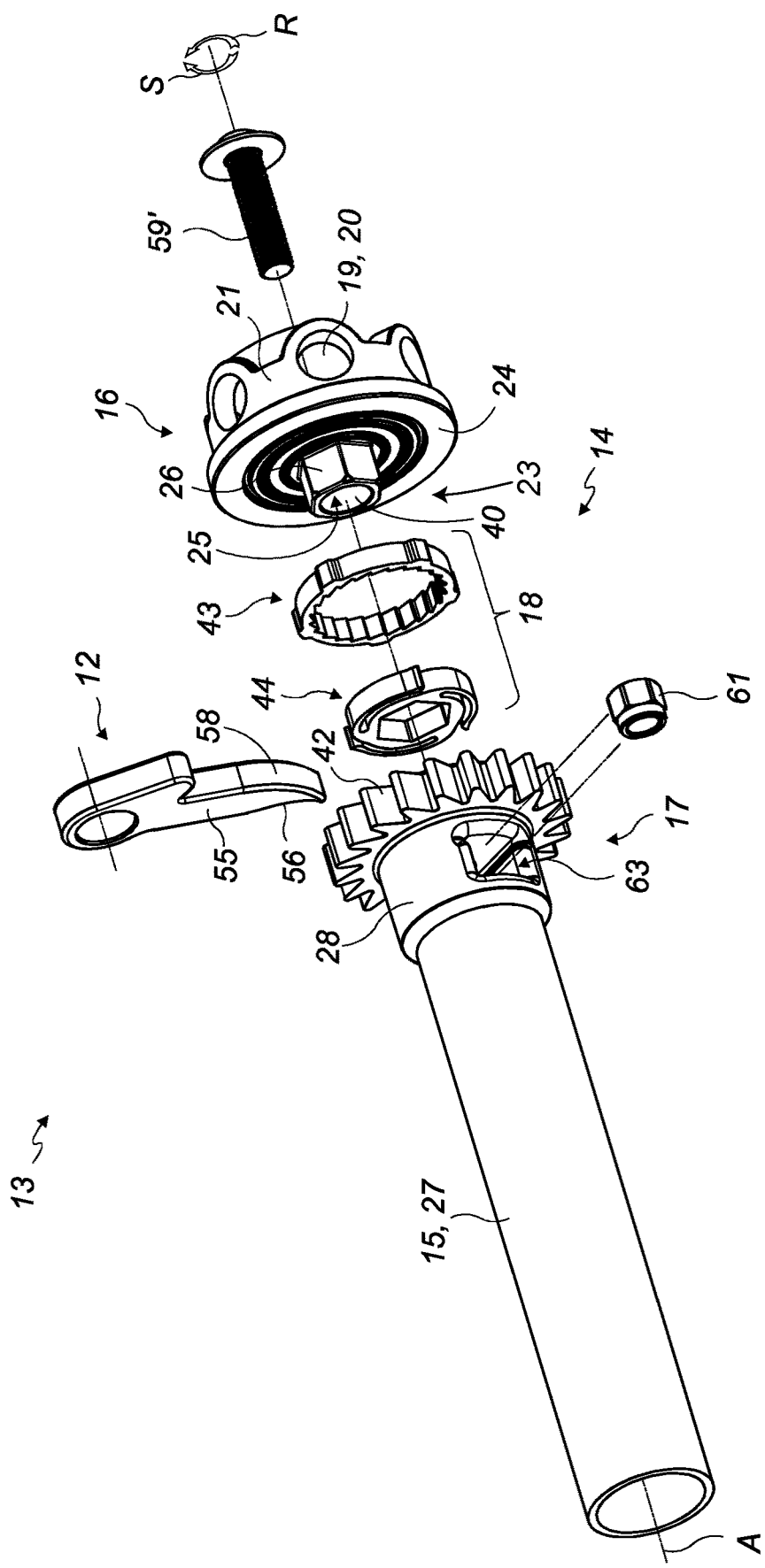
FIG. 14 is a rear perspective view of a tie-down tensioner according to an alternative embodiment of the invention and shown as an exploded view.
Figure 15:
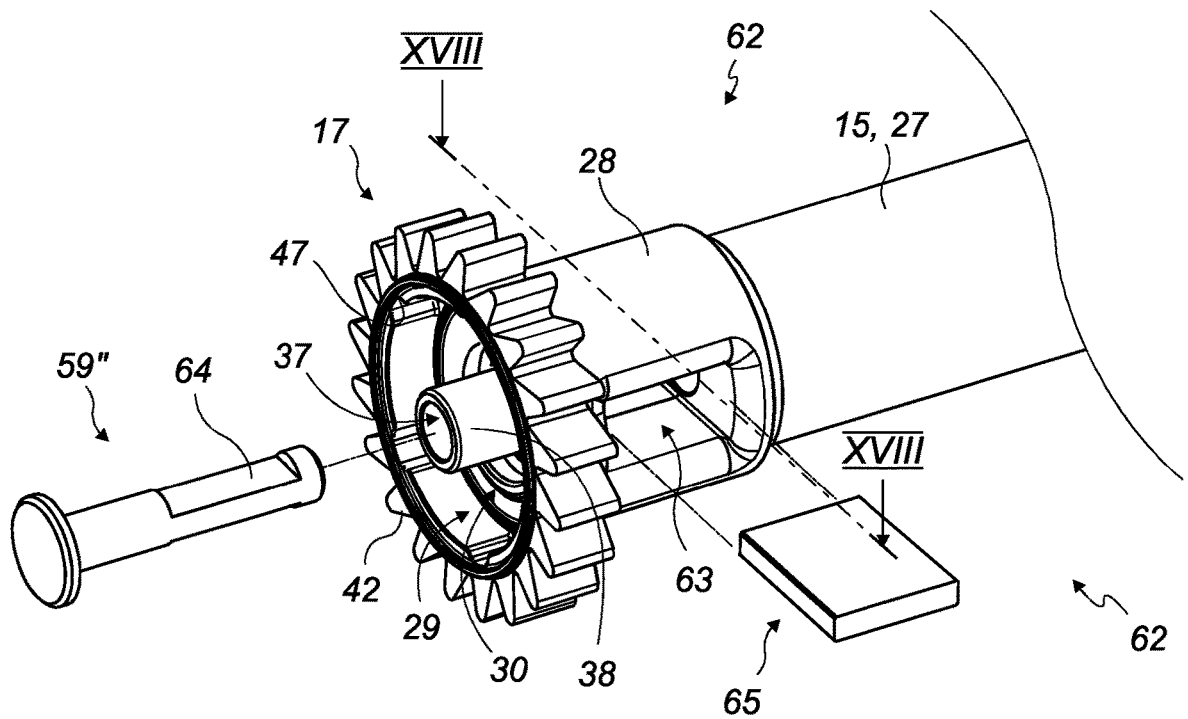
FIGS. 15 and 16 are detailed front perspective views of a winding shaft secured to a ratchet engagement head according to variants of the alternative embodiment of the invention.

One or more access windows (63) are consequently provided in the body (28) of the tie-down engagement head (17) to allow the nut or the elastic ring to be fitted and to be accessed, as shown, for example, in FIG. 14.

The tie-down engagement head (17) preferably comprises two access windows (63) provided facing each other at the location provided for the nut (61) of the translational stop device.

Naturally, in the alternative embodiment of the invention shown in FIGS. 14 to 23, the ratchet engagement head (16), the ratchet drive mechanism (18) and the pawl (12) of the tie-down system (13) remain similar to those envisaged for the tie-down system (13) shown in FIGS. 3 to 13.

It should be noted that the nut (61) of the translational stop device is only one example of means for immobilizing the screw (59'), which in this case has a threaded rod.

When the translational stop device comprises a rod (59"), it is possible to use several immobilization means for said rod (59").

Thus, in the variant shown in FIGS. 15, 18, 20 and 21, the rod (59") has at least one shoulder (64) formed on its body, and the translational stop device comprises a key (65) intended to be inserted through an access window (63), coming into immobilizing abutment against a shoulder (64) formed on the body of the rod (59").

Figure 16:
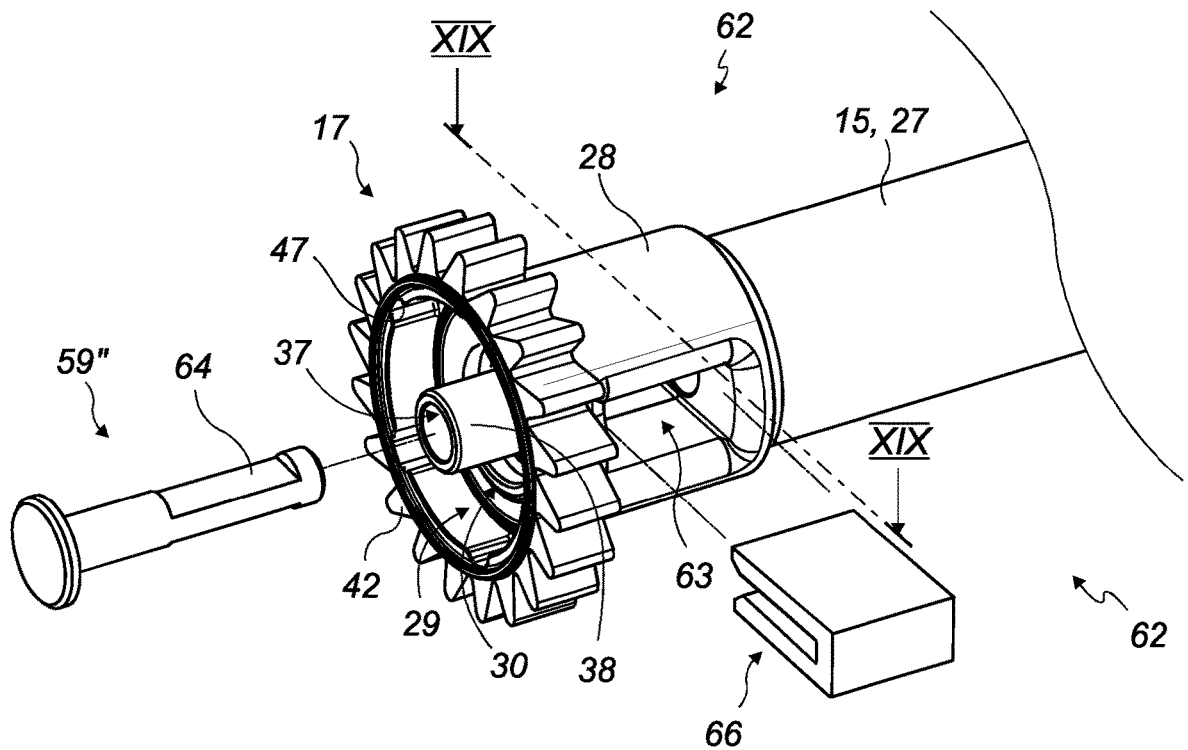
Figure 19:
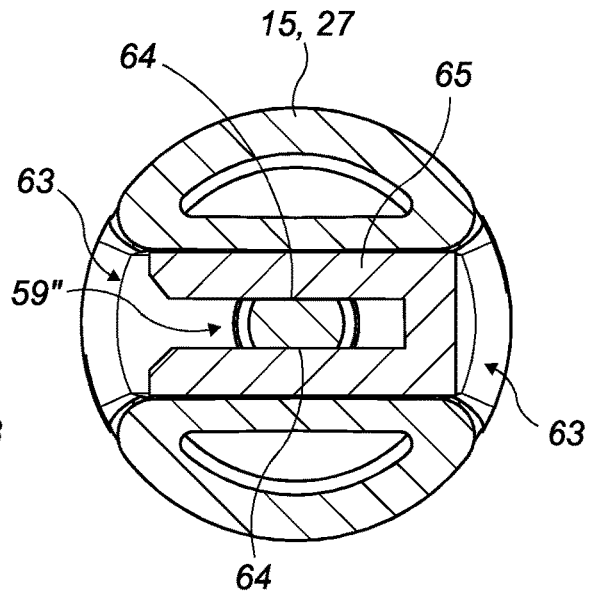

In the variant shown in FIGS. 16 and 19, the rod (59") has two opposing shoulders (64) formed on its body, and the translational stop device comprises a clip (66) in the form of a stirrup intended to be inserted through an access window

(63) and to grip the two shoulders (64) formed on the body of the rod (59") in order to immobilize the latter.

When mounting a tie-down system (13) according to the embodiments of the invention shown in FIGS. 3 to 13 on the chassis (3') of a platform (3) of the car-carrying vehicle, the tie-down engagement head (17) and the winding shaft (15) are not pre-assembled.

According to one example of assembly, the ratchet engagement head (16), the tie-down engagement head (17) and the drive mechanism (18) are inserted into a cavity provided in the chassis (3') from a first side, and the winding shaft (15) is then inserted into this same cavity from another side and received in the cavity (33) of the tie-down engagement head (17). The winding shaft (15) is then held in place in the cavity (33) by inserting a pin (34), a dowel, a screw, or any other similar means, through the coaxial through-openings (35' and 35") extending transversely respectively through the body (28) of the tie-down engagement head (17) and the tube (27).

In order to retain the tie-down system (13) in its cavity provided in the chassis (3'), the pin (34) or other similar means also protrudes outwards out of the tie-down engagement head (17), coming to bear on an inner face (67) of the chassis (3'), as shown in FIG. 7.

When mounting a tie-down system (13) according to the embodiments of the invention shown in FIGS. 14 to 23 on the chassis (3') of a platform (3) of the car-carrying vehicle, all the parts of the tie-down system (13) are pre-assembled, apart from the pawl (12).

According to an example of assembly shown in FIGS. 20 to 23, the tie-down system (13), apart from the pawl (12), is inserted—preferably in the pre-assembled state—from a first side through a cavity provided in the chassis (3'), while the free end of the winding shaft (15) protrudes outwards out of the other side of said cavity.

Figure 17:
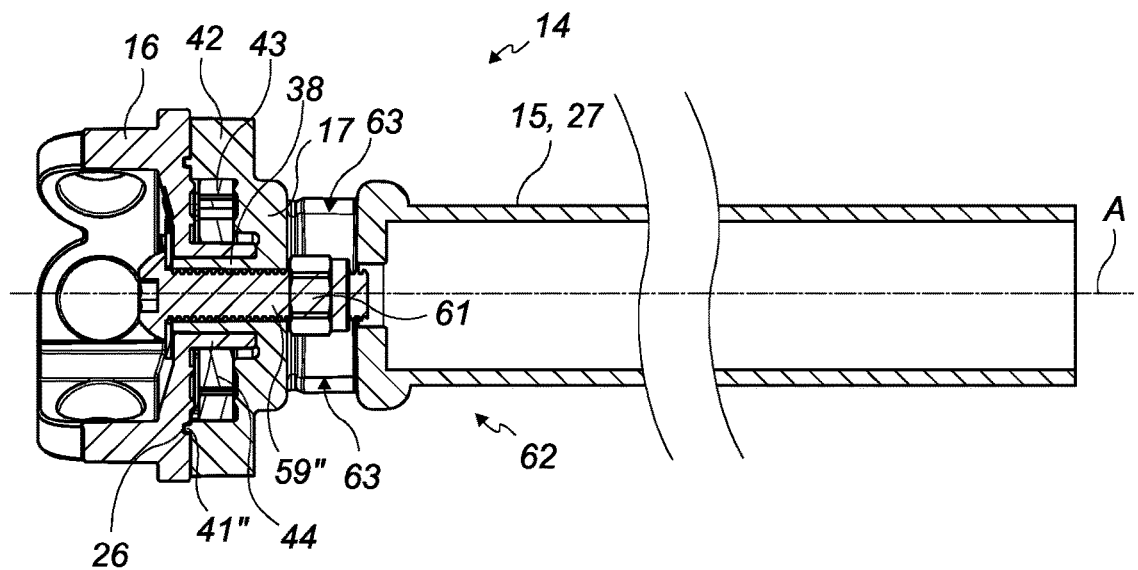
FIG. 17 is a longitudinal cross-sectional view of the tie-down tensioner according to the alternative embodiment of the invention of FIG. 14 shown assembled.
Figure 18:
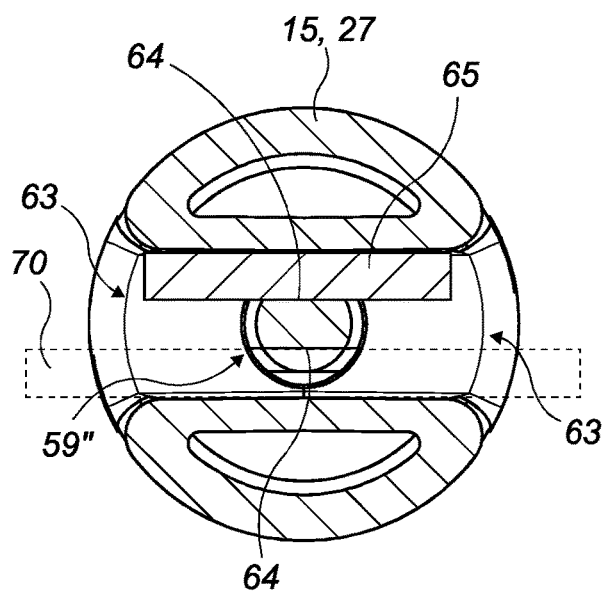
FIGS. 18 and 19 are transverse cross-sectional views of the tie-down tensioner according to the alternative embodiment of the invention respectively of FIGS. 15 and 16 shown assembled.

The parts of the pre-assembled tie-down system (13) are held together by the key (65) in FIGS. 15 and 18 to 21, by the clip (66) in FIG. 16 and by the nut (61) in FIG. 17.

In the event that the translational stop device preferably comprises a screw (59') associated with a nut (61), or a rod (59") associated with an elastic ring or with a clip (66), the tie-down system (13) is immobilized in its cavity provided in the chassis (3'), for example, by the pin (34) or other similar means which projects outwards out of the tie-down engagement head (17), coming to bear on an inner face (67) of the chassis (3'), as shown in FIG. 7.

Figure 20:
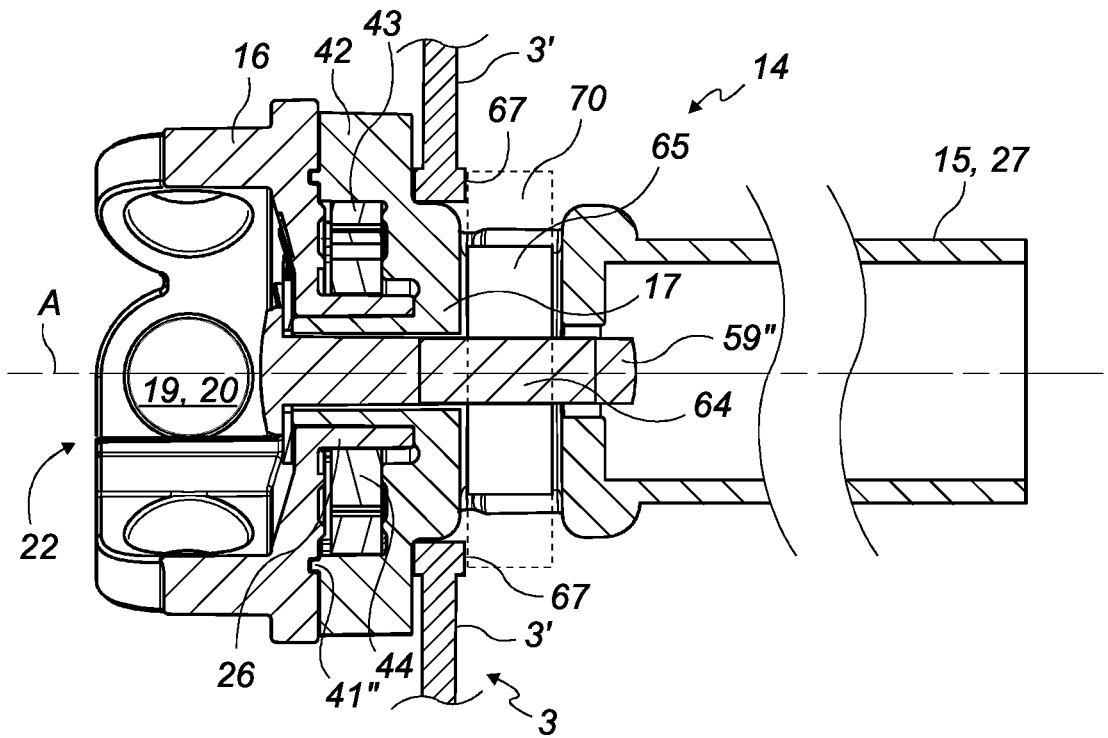
FIG. 20 is a longitudinal cross-sectional view of the tie-down tensioner according to the alternative embodiment of the invention of FIG. 15 shown assembled.
Figure 21:
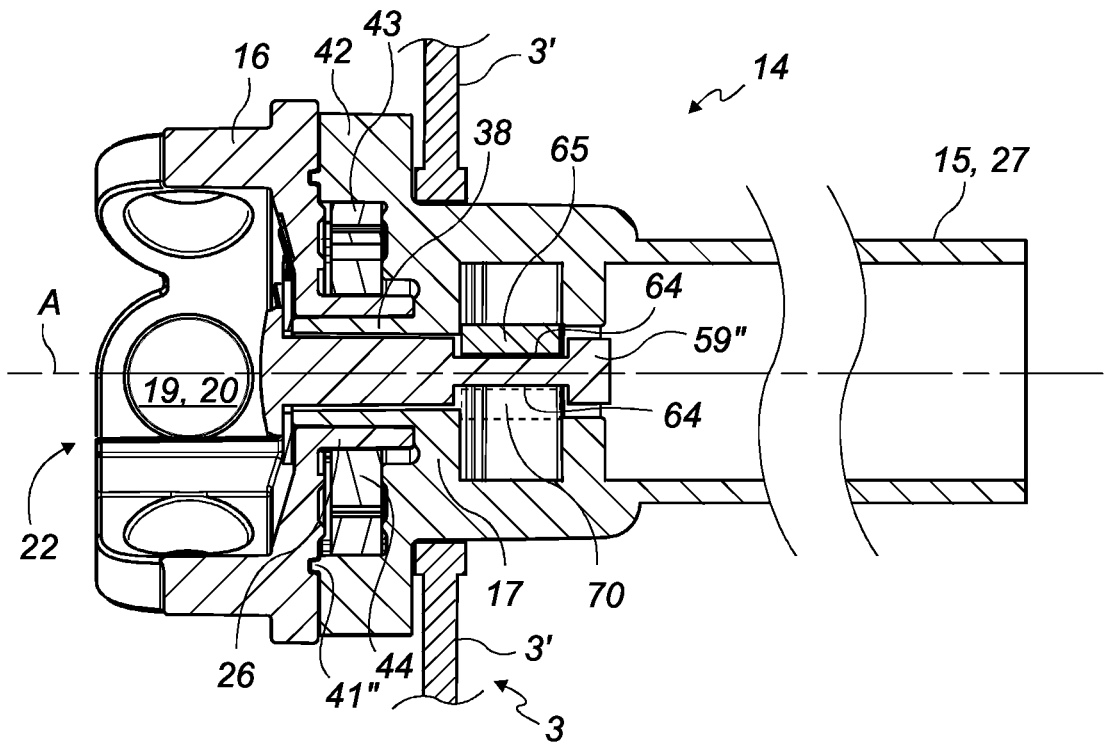
FIG. 21 is a similar longitudinal cross-sectional view of the tie-down tensioner according to the alternative embodiment of the invention according to a cutting plane orthogonal to that of FIG. 20.

In the event that the translational stop device preferably comprises a rod (59") having two shoulders (64) and associated with a key (65), the tie-down system (13) is immobilized in its cavity provided in the chassis (3'), for example, by inserting a second immobilization key (70) which comes into immobilizing abutment against the second shoulder (64) formed on the body of the rod (59"). In this case, the first key (65) is used to pre-assemble the tie-down system (13), while the second key (70), which is longer than the first key (65) in order to project outwards out of the tie-down engagement head (17), comes to bear on an inner face (67) of the chassis (3'), as shown in FIG. 20. This second immobilization key (70) is shown in phantom lines in FIGS. 18, 20, and 21.

An immobilization device (68) may be provided at the free end of the winding shaft (15) to hold the tie-down system (13) in the cavity provided in the chassis (3').

Figure 22:
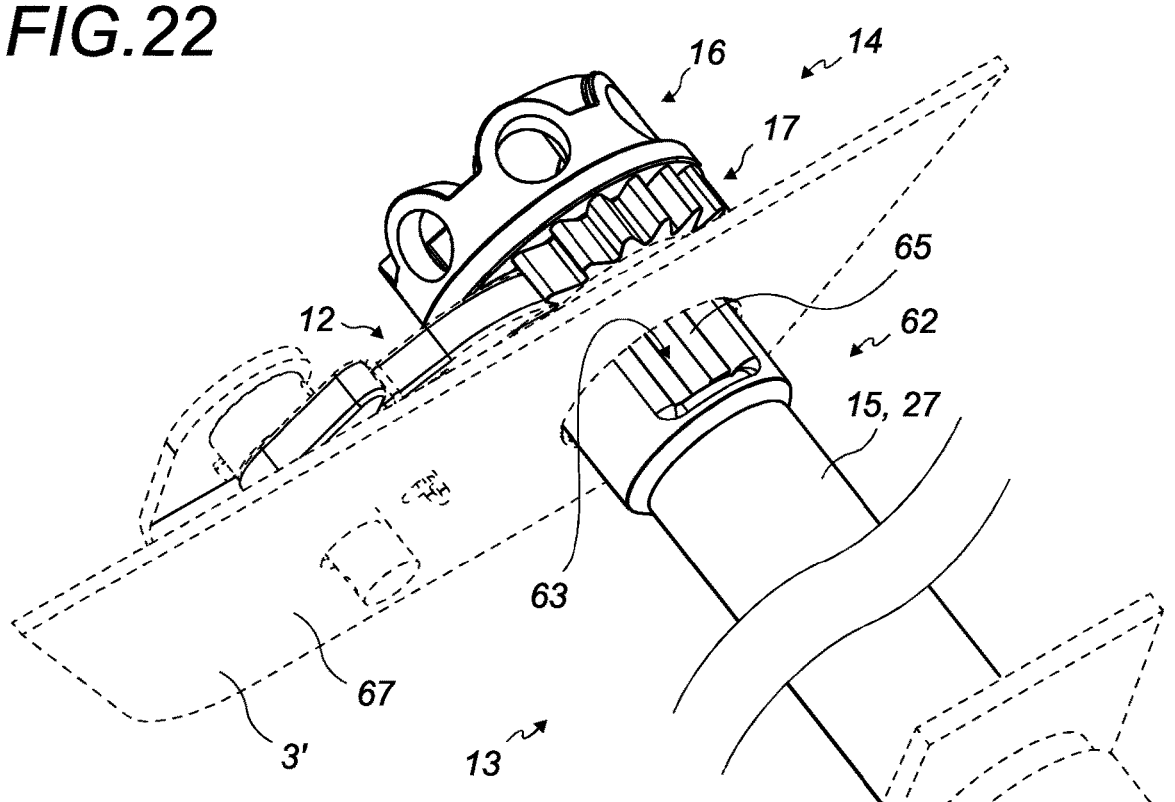
FIG. 22 is a rear perspective view of a tie-down tensioner according to the alternative embodiment of the invention and shown mounted on the chassis of a platform of the car-carrying vehicle, wherein said chassis and the parts holding the tie-down tensioner on the chassis are shown in phantom lines.
Figure 23:
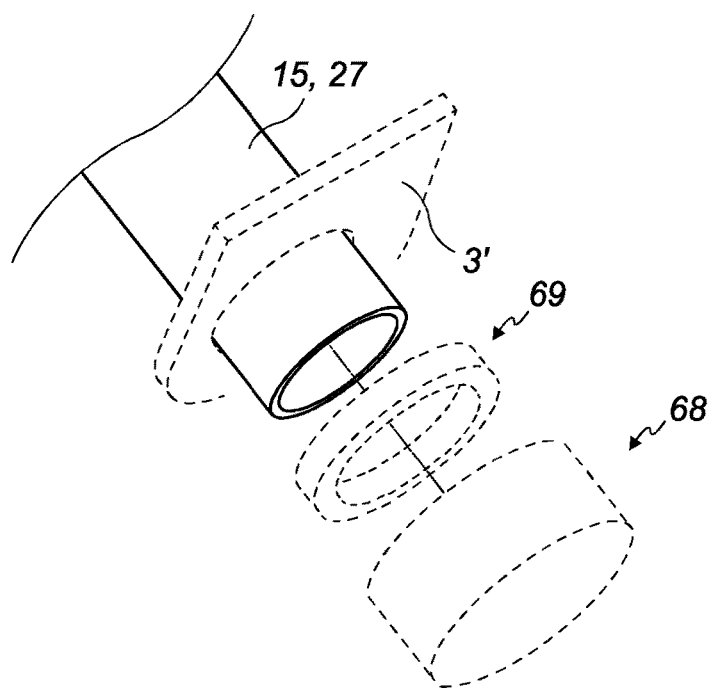
FIG. 23 is a detailed view of FIG. 22, in which the parts holding the winding shaft are shown in a disassembled state.

In FIGS. 22 and 23, the immobilization device (68) is shown schematically by a cylinder. This immobilization device (68) may, for example, be in the form of a ring to be mounted on the free end of the winding shaft (15) or a pin to be mounted through the free end of the winding shaft (15).

The immobilization device (68) is nevertheless optional, because the translational stop device housed in the ratchet engagement head (16) is theoretically sufficient to keep the tie-down engagement head (17), the ratchet engagement head (16) and the parts they contain assembled together, while the pin (34), the dowel, the screw, or any other similar means prevents the tie-down tensioner (14) and the winding shaft (15) from moving in translation with respect to the chassis (3').

One or more shims (69) may be provided between the front face (29) of the tie-down engagement head (17) and the opposing face of the chassis (3') against which said front face (29) is mounted, and/or between the free end of the winding shaft (15) and the other opposing face of the chassis (3') through which said free end projects.

These shims make it possible, in particular, to adjust the longitudinal positioning of the tie-down tensioner (14) and of the winding shaft (15) with respect to the chassis (3').

The shim (69) and the immobilization device (68) mounted on the free end of the winding shaft (15) are shown in a disassembled state in FIG. 23.

During use, when an operator wishes to use the tie-down system (13) according to the invention to tension a tie-down fastened to the winding shaft (15), he or she must move the tensioning bar (11) back and forth, in the manner of a ratchet wrench.

If the tensioning bar (11) is removable, he or she must first insert one of its free ends into one of the coupling shapes (19) provided for this purpose in the outer periphery of the ratchet engagement head (16).

When the operator actuates the tensioning bar (11) in such a way as to rotate the ratchet engagement head (16) in the tensioning direction (S), the latter causes the gear (44) to be rotated at the profiles (26, 53). The gear (44) in turn rotates the self-centering crown (43) by pressing the raised shapes of its outer toothing (49) against the inner toothing (48) of the self-centering crown (43). The self-centering crown (43) then causes the tie-down engagement head (17) to rotate at their engagement shapes (46, 47). The winding shaft (15), which is fixed to the tie-down engagement head (17), secured thereto or integral therewith, is then also rotated and winds the tie-down to tension it. During this rotation, the engagement tooth (56) of the pawl (12) slides via its concave curved surface (58) over the outer inclined teeth (42) of the tie-down engagement head (17), allowing the latter to rotate freely.

When the operator releases the tensioning bar (11), the tie-down engagement head (17) tends to be pulled naturally back in the opposite direction and to be rotated in the return to initial position direction (R) by the tension exerted by the tie-down. The engagement tooth (56) of the pawl (12) then engages in a tooth root (57) of the outer inclined teeth (42) of the tie-down engagement head (17) to prevent it from rotating in the return to initial position direction (R), thereby maintaining the tension of the tie-down.

When the operator actuates the tensioning bar (11) in such a way as to rotate the ratchet engagement head (16) in the return to initial position direction (R), the latter causes the gear (44) to be rotated at the profiles (26, 53). The raised shapes of the outer toothing (49) of the gear (44) then slide over the inner toothing (48) of the self-centering crown (43) without rotating the self-centering crown (43). Thus, the tie-down engagement head (17) does not rotate, and nor does the winding shaft (15), and the tie-down remains wound around the winding shaft (15).

Clearly, the present description is not limited to the explicitly described examples, but also comprises other embodiments and/or implementations. Thus, a described technical feature may be replaced by an equivalent technical feature without departing from the context of the present invention as defined in the accompanying claims and a described step for implementing the method may be replaced by an equivalent step without departing from the context of the invention as defined in the claims.

The invention claimed is:

1. A ratchet tie-down tensioner comprising:
   a ratchet engagement head that is rotated, when actuated in a tensioning direction and in a return to initial position direction opposite the tensioning direction;
   a tie-down engagement head connected to a tie-down winding shaft for rotating said tie-down winding shaft, said tie-down engagement head having a hollow body with inclined teeth on its outer periphery;
   a pawl engaged with the outer inclined teeth of the tie-down engagement head in order to allow the tie-down engagement head to rotate in the tensioning direction and prevent the engagement head from rotating in the return to initial position direction; and
   a ratchet drive mechanism located between the ratchet engagement and tie-down engagement heads;
   wherein the drive mechanism comprises the following two distinct parts:
   a self-centering crown floatingly supported in the hollow body of the tie-down engagement head for rotating the tie-down engagement head when the self-centering crown is rotated, said self-centering crown having a toothing on its inner periphery; and
   a gear attached to the ratchet engagement head and mounted in the self-centering crown, said gear having a toothing on its outer periphery provided to engage with the inner toothing of the self-centering crown in order to rotate the self-centering crown when the gear rotates in the tensioning direction and to slide over the inner toothing of the self-centering crown without rotating the self-centering crown when the gear rotates in the return to initial position direction;
   and wherein:
   at least one of the toothings is formed by curved spring blades extending substantially following the periphery on which said toothing is situated, each spring blade having a tooth at its free end provided in order for the toothing of the gear to mesh with the toothing of the self-centering crown.

2. A tie-down tensioner according to claim 1, wherein one of the following facts applies:
   the inner toothing of the self-centering crown is formed from inclined teeth and the outer toothing of the gear is formed from the spring blades;
   the inner toothing of the self-centering crown is formed from the spring blades and the outer toothing of the gear is formed from inclined teeth; or
   the inner toothing of the self-centering crown and the outer toothing of the gear are formed from the spring blades.

3. A tie-down tensioner according to claim 1, wherein the ratchet engagement head, the tie-down engagement head, the self-centering crown and the gear are centered around the same longitudinal axis of rotation.

4. A tie-down tensioner according to claim 1, further comprising a translational stop device which connects the ratchet engagement head, the tie-down engagement head, the self-centering crown and the gear in order to prevent them from becoming detached along the longitudinal axis of rotation of the tie-down tensioner.

5. A tie-down tensioner according to claim 4, wherein the translational stop device comprises a screw associated with a nut, or a rod associated with a clip.

6. A tie-down tensioner according to claim 4, wherein the body of the tie-down engagement head has one or more access windows in order to allow a part of the translational stop device to be installed.

7. A tie-down tensioner according to claim 6, wherein the body of the tie-down engagement head has two access windows provided facing each other.

8. A tie-down tensioner according to claim 6, wherein one of the following facts applies:
   the translational stop device comprises a rod having at least one shoulder formed on its body, and a key intended to be inserted through an access window, coming into immobilizing abutment against a one of the at least one shoulder formed on the body of the rod; or
   the translational stop device comprises a rod having two opposite shoulders formed on its body, and a clip in the form of a stirrup intended to be inserted through an access window and to grip the two shoulders formed on the body of the rod.

9. A tie-down tensioner according to claim 1, wherein the self-centering crown has, on its outer periphery, engagement shapes complementary to engagement shapes provided in the inner periphery of the hollow body of the tie-down engagement head, the engagement shapes allowing mutual rotational play between the self-centering crown and the tie-down engagement head preventing a tight fit.

10. A tie-down tensioner according to claim 9, wherein the self-centering crown has male engagement shapes on its outer periphery and wherein the tie-down engagement head has complementary female engagement shapes in the inner periphery of its hollow body.

11. A tie-down tensioner according to claim 1, wherein the ratchet engagement head has a circular contact surface designed to come into sealing contact against a circular contact surface of the tie-down engagement head.

12. A tie-down tensioner according to claim 11, wherein the sealing between the two circular contact surfaces is obtained by complementary circular baffles formed in said circular contact surfaces.

13. A tie-down tensioner according to claim 1, wherein:
   the end tooth of each said spring blade of the gear is curved radially outwards and has a convex domed surface on its inner face; or
   the end tooth of each spring blade of the self-centering crown is curved radially inwards and has a convex domed surface on its outer face.

14. A tie-down tensioner according to claim 1, wherein the gear is mounted on the ratchet engagement head via complementary shaped recessed or raised profiles provided in the gear and on the ratchet engagement head respectively.

15. A tie-down tensioner according to claim 14, wherein the gear has a non-circular central through-opening for mounting the gear on a male part of the complementary shape of the ratchet engagement head.

16. A tie-down tensioner according to claim 14, wherein at least one profile is in the form of a hexagonal head.

17. A tie-down tensioner according to claim 1, wherein the self-centering crown and/or the gear has/have at least three of the spring blades distributed over the inner periphery of the self-centering crown and/or over the outer periphery of the gear.

18. A tie-down tensioner according to claim 5, wherein the body of the tie-down engagement head has one or more access windows in order to allow a part of the translational stop device to be installed.

19. A tie-down tensioner according to claim 7, wherein:
- the translational stop device comprises a rod having at least one shoulder formed on its body, and a key intended to be inserted through an access window, coming into immobilizing abutment against a one of the at least one shoulder formed on the body of the rod; or
- the translational stop device comprises a rod having two opposite shoulders formed on its body, and a clip in the form of a stirrup intended to be inserted through an access window and to grip the two shoulders formed on the body of the rod.

* * * * *